US006687234B1

(12) United States Patent
Shaffer et al.

(10) Patent No.: US 6,687,234 B1
(45) Date of Patent: Feb. 3, 2004

(54) APPARATUS AND METHOD FOR OPTIMAL CONFERENCE CALL RENEGOTIATION IN TELEPHONY OVER LAN SYSTEMS

(75) Inventors: Shmuel Shaffer, Palo Alto, CA (US); William Joseph Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/412,562

(22) Filed: Oct. 5, 1999

(51) Int. Cl.[7] .............................................. H04L 12/16
(52) U.S. Cl. ...................................................... 370/260
(58) Field of Search ................... 379/202.01, 201–206, 379/205.01; 370/206–263, 200, 270, 395, 486, 352, 356, 408, 400–403, 410, 256–260, 230, 465, 252; 709/204–206, 223, 231, 227–229, 237, 105; 348/15

(56) References Cited

U.S. PATENT DOCUMENTS

| | | | | |
|---|---|---|---|---|
| 5,546,395 A | | 8/1996 | Sharma et al. ............... | 370/468 |
| 5,867,494 A | * | 2/1999 | Krishnaswamy et al. ... | 370/352 |
| 5,978,463 A | * | 11/1999 | Jurkevics et al. ...... | 379/202.01 |
| 6,018,360 A | * | 1/2000 | Stewart et al. ............... | 379/202 |
| 6,202,084 B1 | * | 3/2001 | Kumar et al. ................ | 709/204 |
| 6,282,278 B1 | * | 8/2001 | Doganata et al. ........... | 379/202 |
| 6,289,369 B1 | * | 9/2001 | Sundaresan ................. | 709/105 |
| 6,438,111 B1 | * | 8/2002 | Catanzaro et al. .......... | 370/260 |
| 6,519,249 B1 | * | 2/2003 | Bennefeld et al. .......... | 370/352 |
| 6,526,445 B1 | * | 2/2003 | Kumar et al. ................ | 709/204 |

* cited by examiner

*Primary Examiner*—Ajit Patel
*Assistant Examiner*—Chuong Ho

(57) ABSTRACT

A multipoint control unit coordinator (MCUC). The MCUC tracks all conferences in a telecommunications system and determines how they can be best configured and modified over time. The MCUC instructs multipoint control units (MCUs) to break down and reconfigure calls, if necessary. A MCUC according to an embodiment of the invention maintains a database of all the MCUs in the system, a measure of processing coding resources, and a geographical location. When two parties seek to add a third in a conference call, the MCUC determines coding resources, geographical locations, and determines the most appropriate media stream mixing location based on preferences, such as network cost or endpoint coding resources or quality. The MCUC then instructs the MCUs to handle the conference accordingly.

17 Claims, 6 Drawing Sheets

APPARATUS AND METHOD FOR OPTIMAL CONFERENCE CALL RENEGOTIATION IN TELEPHONY OVER LAN SYSTEMS

BACKGROUND OF THE INVENTION

1. Field of the Invention

The present invention relates to telecommunications systems and, particularly, to an improved system and method for multimedia conferencing.

2. Description of the Related Art

The ITU-T (International Telecommunications Union Telecommunications Sector) Recommendation H.323 defines a set of protocols for communicating using audio, video and data over packetswitched networks, such as for communication in telephony-over-local area network (ToL) systems. To accommodate multipoint conferences (i.e., those involving three or more parties), the Recommendation H.323 defines a multipoint control unit (MCU) to coordinate the conferencing. In particular, the MCU is required by the Recommendation H.323 to include a multipoint controller (MC), which handles H.245 signaling. In addition, the MCU may include one or more multipoint processors (MP), which mix and process the data streams. The MPs may also provide conversion, or transcoding, between different codecs.

In a centralized multipoint conference mode, the MCU handles call signaling, mixes audio and video streams, performs transcoding, and re-transmits the results to all parties to the conference. In a decentralized multipoint conference mode, the MCU does not process the media streams, which are instead handled directly between the endpoints.

Once a conference call is established, there is no way in conventional H.323 systems to change from a centralized to decentralized mode, or vice versa, as parties are added. Further, there is no way to switch from one MCU to another. That is, there is no way to change the site of the mixing of the media streams. Moreover, there is no way for an administrator to select a preference in choosing the site of the mixing of the media streams. Thus, as parties are added sequentially to a conference, sub-optimal mixing locations may be used.

This is illustrated by way of example in FIGS. 1A and 1B. As seen in FIG. 1A, an endpoint User A calls an endpoint User B. The endpoint User A then conferences in User C. Because the endpoint User A has sufficient resources, the endpoint User A handles the media mixing for the conference (i.e., the de-centralized model), as represented by paths A-B and A-C. Call signaling is handled with the MCU, in a known manner.

The endpoint User B may then wish to add an endpoint User D to the conference. However, if the endpoint User B does not have on-board mixing resources, a request will be made to the MCU to handle the mixing. The result is seen in FIG. 1B. The connections are now endpoint User A to MCU (A-MCU), endpoint User A to endpoint User C (A-C), endpoint User B to MCU (B-MCU), and endpoint User D to MCU (D-MCU). In effect, two conferences are occurring: When endpoint User A mixes media streams of MCU and endpoint User C, the MCU input is actually the result of the endpoint User B and endpoint User D media mix. When the MCU mixes media streams of endpoints A, B and D, the endpoint User A media input to the MCU is already the result of the endpoints A and C media mix.

As more calls are added, additional mixing locations may be necessary. If the ToL system spans a WAN (wide area network) or uses a gateway to connect to another system, long distance charges may be incurred as a result of poor mixing choices.

In such situations as well as other situations, it can be desirable to select a preference between long distance network cost or processor resource use in ToL multipoint conferencing.

SUMMARY OF THE INVENTION

These and other drawbacks in the prior art are overcome in large part by a telecommunications system in accordance with an embodiment of the invention. A telecommunications network includes a multipoint control unit coordinator (MCUC). The MCUC tracks all conferences in the system and determines how they can be best configured and modified over time. The MCUC instructs MCUs to break down and reconfigure calls, if necessary.

A MCUC according to an embodiment of the invention maintains a database of all the MCUs in the system, a measure of processing coding resources, and a geographical location. When two parties seek to add a third in a conference call, the MCUC determines coding resources, geographical locations, and determines the most appropriate mixing location based on such preferences. The MCUC then instructs the MCUs to handle the conference accordingly.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 2–6 illustrate an improved multipoint conferencing system and methods. The present invention provides for more optimal selection of media stream mixing locations in multipoint conferencing. Optimal selection of media stream mixing locations may be based on network cost or on endpoint coding resources. Moreover, such optimization may occur as new users are added to the multipoint conference. Optimization of network cost may be based on minimizing long distance costs, for example. Optimization of endpoint coding resources may be based on, for example, determining an MCU with the most available coding resources or optimizing quality levels.

Figure 1A:
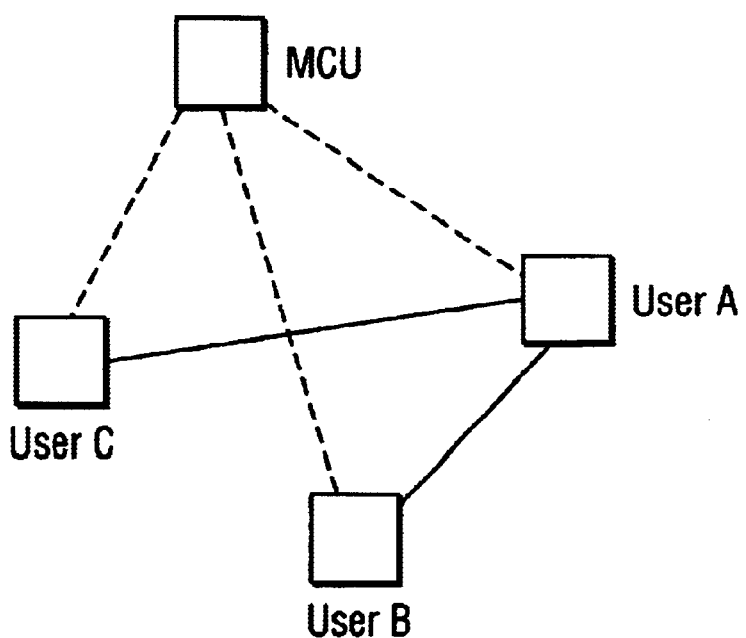
FIG. 1A and FIG. 1B illustrate operation of an MCU according to the prior art.
Figure 1B:
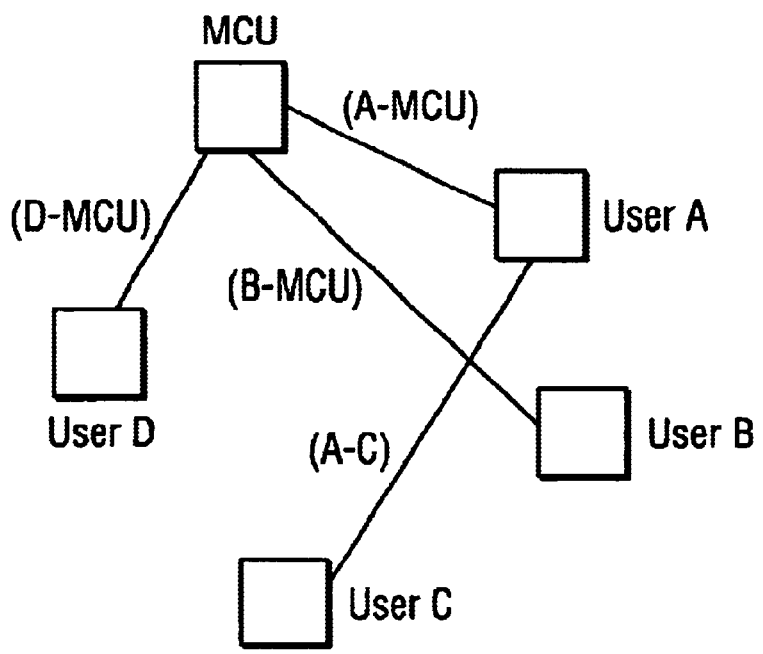
Figure 2:
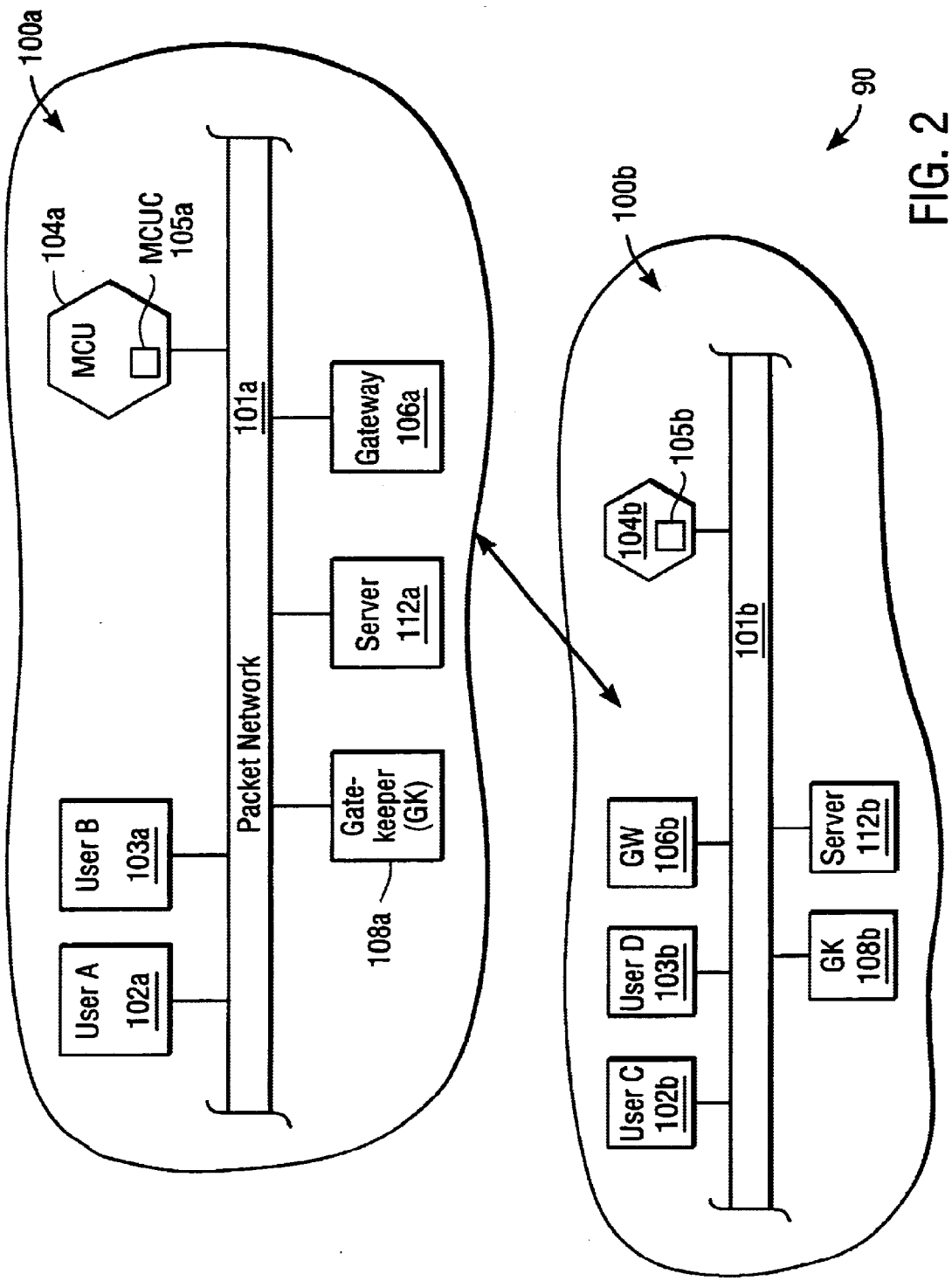
FIG. 2 illustrates a telecommunications network according to an embodiment of the invention.

Turning now to the drawings, and with particular attention to FIG. 2, a diagram illustrating an exemplary H.323 telecommunications system 90 according to an embodiment of the present invention is shown. It is noted that, while described specifically in the context of voice packets, the present invention encompasses the use of any multimedia information, such as video, data, voice, or any combinations thereof. Moreover, an exemplary generic H.323 system is the Siemens HiNet™ RC 3000 system, available from Siemens.

As shown, the H.323 telecommunications system 90 includes a pair of telecommunications zones or networks 100a, 100b. Each telecommunications zone 100a, 100b includes a local area network (LAN) or packet network 101a, 101b. Coupled to the LANs 101a, 101b may be a variety of H.323 terminals 102a, 103a, 102b, 103b, respectively, multipoint control units (MCU) 104a, 104b according to the present invention, H.323 gateways 106a, 106b, H.323 gatekeepers 108a, 108b, LAN servers 112a, 112b and a plurality of other devices such as personal computers (not shown). The H.323 terminals 102a, 102b, 103a, 103b are in compliance with the H.323 Recommendation. Thus, the H.323 terminals 102a, 102b, 103a, 103b support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 terminals 102a, 102b, 103a, 103b may further implement audio and video codecs, T.120 data conferencing protocols and MCU capabilities. Further details concerning the H.323 Recommendation may be obtained from the International Telecommunications Union; the H.323 Recommendation is hereby incorporated by reference in its entirety as if fully set forth herein.

The MCUs 104a, 104b include multipoint control unit coordinators (MCUC) 105a, 105b according to the present invention. As will be described in greater detail below, the MCUCs 105a, 105b are used to coordinate multipoint conferencing and relay multipoint conference requests to MCUs, as appropriate. Moreover, while shown in the context of a plurality of zones, a single MCUC may be employed within a single zone. Furthermore, while shown as associated with an MCU 104, the MCUCs 15a, 105b may be a stand-alone unit or placed on any network device. Thus, the figure is exemplary only.

Figure 3:
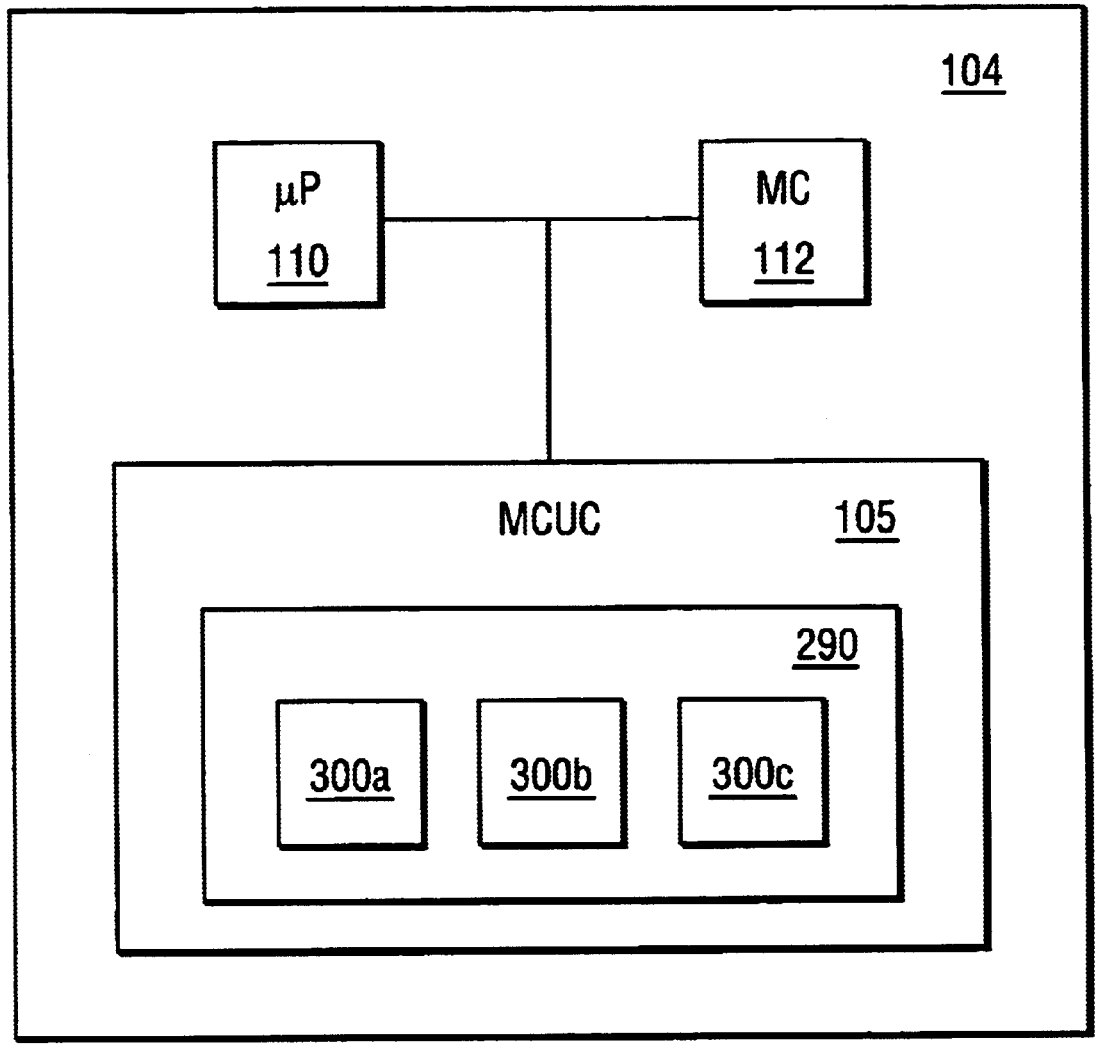
FIG. 3 illustrates a multipoint control unit according to an embodiment of the invention.

As shown in FIG. 3, each exemplary MCU 104 includes a Multipoint Processor (MP) 110 and a Multipoint Controller (MC) 112, as well as a Multipoint Control Unit Coordinator 105. The MP 110 effects the actual media signal processing, i.e., switching, and the like. The MC 112 handles H.245capability negotiations to determine existence of a common codec. As will be explained in greater detail below, the MCUC 105 provides for more optimal selection of the media stream mixing location. Thus, the MCUC 105 includes a storage unit 290 for storing network information relevant to the multipoint conferencing. The storage unit 290 may include MCU information 300a (i.e., an identification of the MCUs within the system), a coding resources storage 300b (i.e., an identification of the endpoint terminals' coding resources), and a geographical identifier 300c for identifying locations of the MCUs within the network. The MCUC 105 is configured to forward MCU call conference commands to the appropriate MCU.

When two parties seek to add a third to a conference call, the request is provided, for example, by a gatekeeper, to the MCUC 105. For example, endpoints User A and User B (102a, 103a) (FIG. 2) may be involved in a conference and seek to conference in User 102b. The gatekeeper (GK1) 108a provides this request to the MCUC 105a. The MCUC 105a checks the geographical location of the three parties and the availability of the DSP resources in each of the three parties if they are registered as MCU providers themselves (i.e., if they are configured to handle de-centralized conferencing). The MCUC 105a then consults the predetermined preferences of the system which are either to optimize network costs or to optimally balance coding resources.

If "optimize network cost" is selected, the MCUC 105a will select among all of the MCU resources to determine which MCU will result in the least number of network connections. Wide area network (WAN) connections are considered first, then local area network (LAN) connections. If more than one MCU resource can provide the same optimal cost, coding resources may be considered.

If "optimally balance coding resources" is selected, the MCUC 105a will attempt to select the MCU with the most free resources that can handle the call in question. If more than one MCU has the same amount of available coding resources, then geographical location may be considered, as described above. In either case, the MCUC 105a decrements the available coding resources in the chosen MCUs entry in the database, based on the codecs selected for the call.

If one of the parties seeks to add an additional caller, the MCUC 105a checks the database to determine the optimal location for the mixing if the new caller is added. If the location stays the same, the MCUC 105a instructs the MCU being used to add the new caller and its resources are decremented in the database. If a new MCU is to be selected, then the original MCU is asked to transfer the calls to the new MCU, which accepts them to begin the new conference. The database is decremented to reflect new resource usage.

If multiple locations are involved, or when no single MCU can be found to handle all the mixing, MCUC 105a can optionally invoke multiple MCUs to form the call. For example, invoking the MCU 104a and the MCU 104b to handle local parties may minimize the long distance costs. That is, the only out-of-network communications will be between the MCUs 104a, 104b, and not directly between parties.

Figure 4:
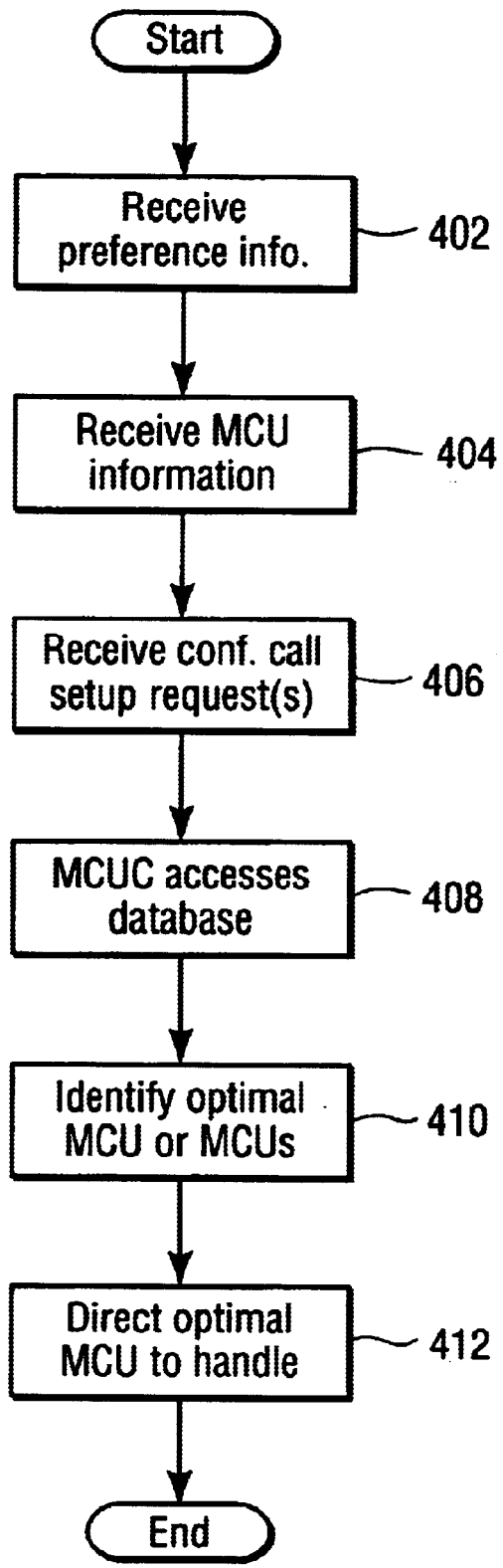
FIG. 4 is a flowchart illustrating operation of an embodiment of the invention.

Turning now to FIG. 4, a flowchart illustrating general operation of the embodiment of the present invention of FIG. 2 is shown. In a step 402, the MCUCs 105a, 105b receive and store preference information. Such preference information is provided by a network administrator and may include, for example, a network cost preference or a coding resources preference. In a step 404, the MCUCs 105a, 105b receive and store MCU information. As discussed above, this includes coding resources related to MCU-capable devices, as well as the location of MCUs and MCU-capable devices. In a step 406, one of the MCUCs 105a, 105b, for example, MCUC 105a, receives conference call setup requests, including, for example, identifications of the parties involved and their locations. Then, in a step 408, that MCUC accesses its database for information concerning MCUs related to the conferencing parties. For example, this may include geographical location information as well as coding resource information. Next, in a step 410, the MCUC 105a identifies the optimal MCU or MCUs based on the criteria which were loaded in step 402. For example, the optimal criteria may be based on minimizing network usage costs, or may be based on using the most available coding resources of the parties and the MCUs to the conference. Next, in a step 412, the MCUC 105a directs the appropriate MCU or MCUs, for example, the MCU 104a, to take charge of the multipoint conference. Thus, the appropriate MCU or MCUs handle the multipoint conference signaling and/or the media mixing.

Figure 5:
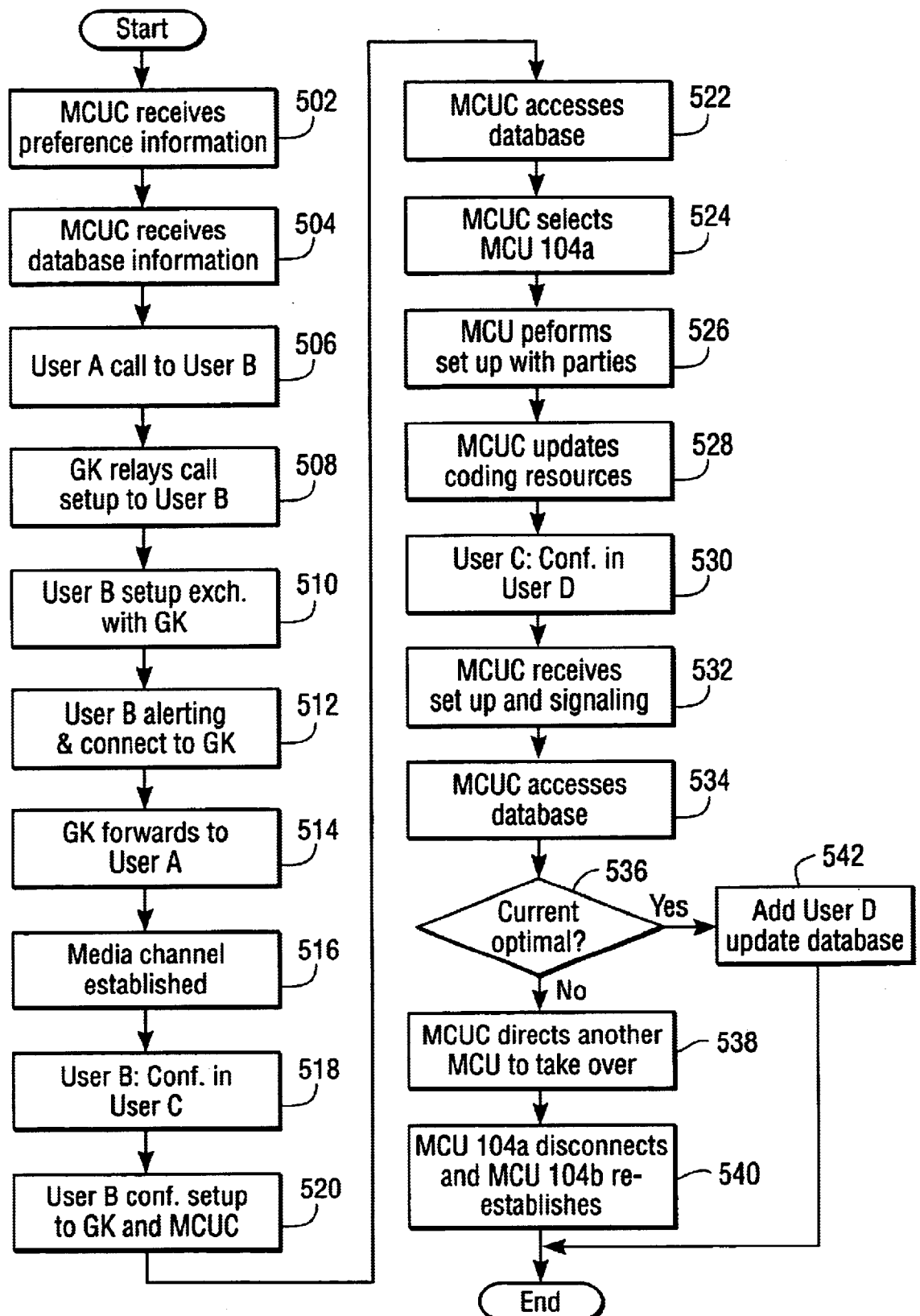
FIG. 5 is a flowchart illustrating operation of another embodiment of the invention.

Turning now to FIG. 5, a flowchart illustrating operation of an exemplary embodiment of the invention, for example, that of FIG. 2, is shown in greater detail. In a step 502, the MCUC 105a receives preference information. As discussed above, such preference information includes, for example, coding resource optimization versus network cost optimization preferencing. In a step 504, the MCUC 105a receives the database information related to the MCUs that are present in the network system. Next, in a step 506, an endpoint User A attempts a call to an endpoint User B, for example by executing an ARQ/ACF exchange and sending call setup commands to the gatekeeper (GK1) 108a. Next, in a step 508, the gatekeeper GK1 relays the call setup information to the endpoint Client B. The endpoint Client B responds, in a step 510, with an ARQ/ACF exchange with the gatekeeper. Then, in a step 512, the endpoint User B sends an H.245 Alerting and Connect message to the gatekeeper GK1. The gatekeeper GK1 then forwards the Alerting and Connect message to the endpoint User A, in a step 514. A media channel is established between the endpoints A and B in a step 516.

In a step 518, the endpoint User B requests to conference in the endpoint User C. In a step 520, the endpoint User B sends the appropriate call setup information to its gatekeeper GK1, which then sends this information to the local MCUC 105a. In a step 522, the MCUC 105a accesses its database for information related to MCUs associated with the existing and requested parties to the conference. In particular, the MCUC 105a determines the optimal mixing location based on the stored preferences. In a step 524, the MCUC 105a selects an MCU, for example, the MCU 104a as the optimal mixer. The MCU 104a then performs multipoint conferencing setup with the endpoints User A and User B, and then, via the gateways 106a, 106b, with the endpoint User C, in a step 526. Next, in a step 528, the MCUC 105a updates its coding resources database to account for the MCU 104a's mixing of the multipoint conference.

In a step 530, the User C seeks to conference in the User D and issues the appropriate call setup and signaling commands. In a step 532, the call setup and signaling commands are received by the MCUC 105a. In a step 534, the MCUC 105a accesses its database to determine the optimal mixing location based on the stored criteria.

In a step 536, the MCUC 105a determines whether the current mixing location is optimal or whether a new site is more optimal. If a new site is more optimal, then the MCUC 105a directs, the corresponding MCU to take over. For example, the MCUC 105a may direct the MCU 104b to take over the mixing for the conference, in a step 538. In this case, the MCU 104b may disconnect the parties to the conference and then re-establish the conference itself, in a step 540. Alternatively, if the users are equipped with secondary signaling and/or media channels, the conference based on the new mixing may be established before closing out the one based on the previous mixer. Back is step 536, if the current mixing location is optimal, the new party, endpoint User D is added and the coding resources database updated accordingly, in a step 542.

Figure 6:
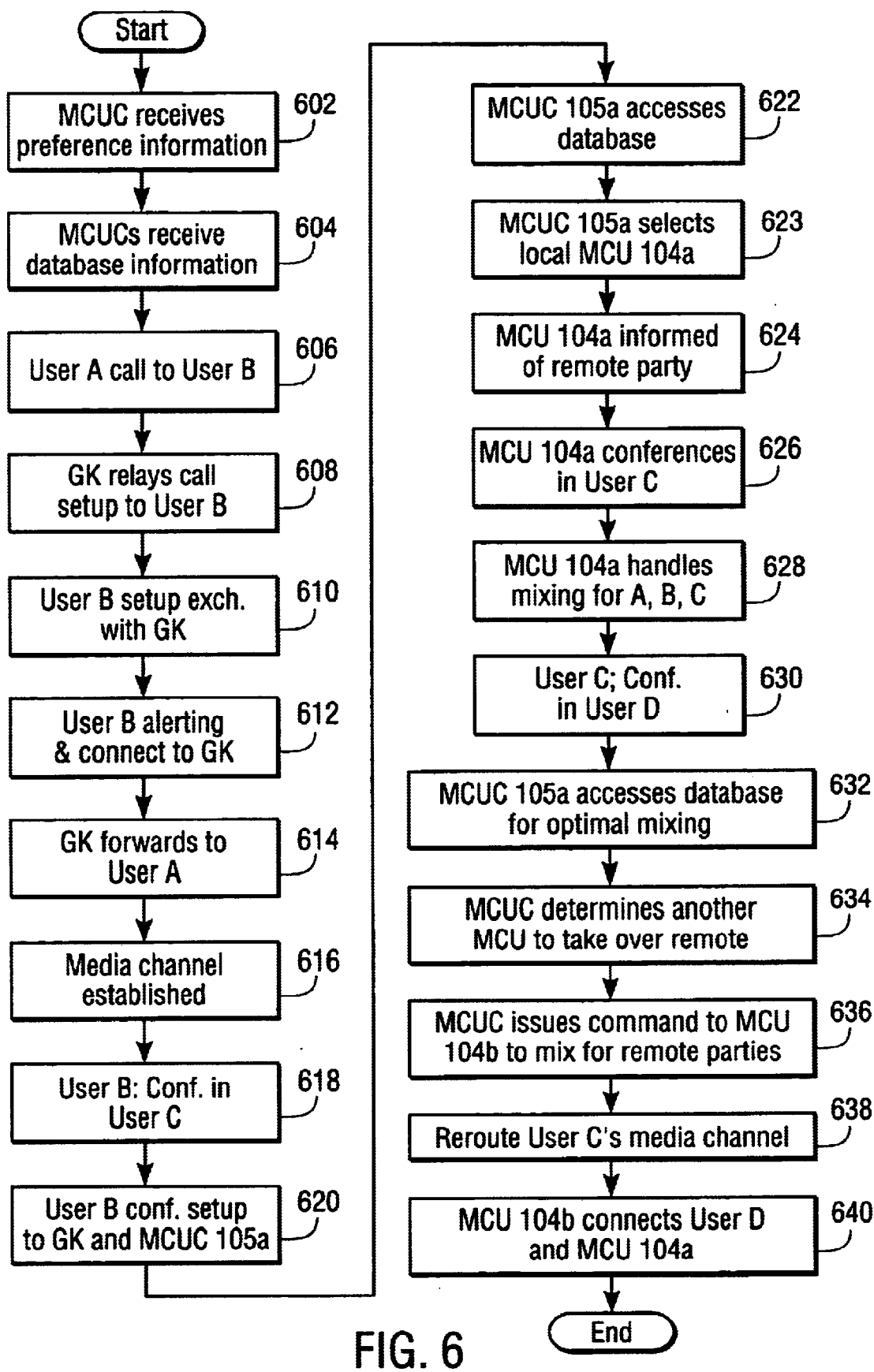
FIG. 6 is a flowchart illustrating operation of another embodiment of the invention.

Turning now to FIG. 6, a flowchart illustrating operation of another exemplary embodiment of the invention is shown. In particular, in the embodiment illustrated, a distributed MCU system is employed by the MCUC to achieve the desired optimization levels. Thus, for example, MCUs perform mixing for local client terminals but jointly handle mixing for inter-network communications. With reference to FIG. 2, for example, the MCU 104a handles mixing for client terminals User A 102a and User B 103a, and the MCU 104b handles mixing for client terminals User C 102b and User D 103b. Such a preference may be configured as a predetermined default by a system administrator.

In a step 602, the MCUCs 105a, 105b receive preference information. As discussed above, such preference information includes, for example, coding resource optimization versus network cost optimization preferencing. In a step 604, the MCUCs 105a, 105b receive database information related to the MCUs and MCU-capable terminals that are present in the network system. Next, in a step 606, an endpoint User A attempts a call to an endpoint User B, for example by executing an ARQ/ACF exchange and sending call setup commands to the gatekeeper (GK1) 108a. Next, in a step 608, the gatekeeper GK1 relays the call setup information to the endpoint User B. The endpoint Client B responds, in a step 610, with an ARQ/ACF exchange with the gatekeeper GK1. Then, in a step 612, the endpoint User B sends an H.245 Alerting and Connect message to the gatekeeper GK1. The gatekeeper GK1 then forwards the Alerting and Connect message to the endpoint User A, in a step 614. A media channel is established between the endpoints A and B in a step 616.

In a step 618, the endpoint User B requests to conference in the endpoint User C. In a step 620, the endpoint User B sends the appropriate call setup information to its gatekeeper, GK1, which then sends this information to the local MCUC 105a. In a step 622, the MCUC 105a accesses its database for information related to MCUs associated with the existing and requested parties to the conference. In particular, the MCUC 105a recognizes that the conference is to take place among two local parties, User A and User B, and one remote party, User C.

In a step 623, the MCUC 105a identifies a local MCU, such as the MCU 104a, as being optimal, based on either network costs or coding resources criteria. In a step 624, the MCUC 105a activates the local, optimal MCU 104a, identifying the local parties to the conference and instructing the MCU 104a that a remote party, User C, exists. The MCU 104a then issues call setup commands and the like via the gateways 106a, 106b, to the endpoint User C of the remote network, in a step 626. Again, these commands may be routed through the gatekeeper GK2, in a manner similar to that described above.

In a step 628, the multipoint conference is established, with the MCU 104a handling mixing for the endpoints User A, User B and User C, and the MCUC 105a updates its coding resource database. Then, in a step 630, one of the parties to the multipoint conference, for example, User C, seeks to conference in another party, such as User D. The User C's request is received by the MCUC 105a. Accessing its database for optimal mixing in a step 632, the MCUC 105a notes that the endpoint User D is a member of the remote network 100b. In a step 634, the MCUC 105a determines that mixing will be optimized if mixing between the endpoints User C and User D, on the one hand, and between endpoints User A and User B, on the other, are handled locally, but that communications across the networks are optimized if mixing occurs across the MCUs 105a, 105b.

In a step 636, the MCUC 105a issues a command to the MCU 104b of the network 100b to handle mixing for the endpoints User C and User D, and across the networks 100a and 100b, with the MCU 104a. The MCU 104a is similarly instructed to perform mixing for the local Users A and B and with the MCU 104b.

The User C's media channel is thus rerouted to the MCU 104b, in a step 638. For example, the User C may be disconnected by the MCU 104a and re-connected to the MCU 104b. Concurrently, the MCU 104b establishes a connection with the endpoint User D and the MCU 104a, in a step 640.

What is claimed is:

1. A telecommunications network, comprising:

one or more multi-point controllers configured to perform call signaling between a multi-point control unit and a plurality of client endpoints;

a multi-point control unit coordinator integrated with one of said multi-point controllers, said multi-point control unit coordinator configured to identify an optimal other one of said one or more multi-point controllers and direct said optimal one to perform multi-point control functions, wherein said multi-point control unit coordinator is configured to make an identification of a new optimal multi-point controller while a conference is ongoing and cause said conference to be redirected to said new optimal multi-point controller.

2. A telecommunications network according to claim 1, wherein said optimal one is one in which network costs are minimized for the conference.

3. A telecommunications network according to claim 1, wherein said optimal one is one which has maximum coding resources available for the conference.

4. A telecommunications network according to claim 1, wherein said optimal one is one in which network costs match predetermined criteria.

5. A telecommunications network according to claim 1, wherein said optimal one is one in which coding quality required for the conference is maximized.

6. A method for operating a telecommunications network, comprising:

receiving a multi-point conference set up request at a multi-point control unit coordinator, said multi-point control unit coordinator being integrated with a multi-point control unit;

identifying one or more multi-point controls units whose use will be optimal according to one or more criteria during said multi-point conference; and relaying said multi-point conference set up request to said one or more multi-point control units after said optimal determination is made;

wherein said identifying and said relaying occur while said conference is ongoing to select a new optimal multi-point control unit.

7. A method according to claim 6, wherein said determining is A made while a first multi-point conference is ongoing and said multi-point conference set up command seeks to add an additional party to said first multi-point conference.

8. A method according to claim 7, further comprising said multipoint control unit coordinator transferring control of said first multi-point conference from a first of said one or more multi-point control units to a second of said one or more multi-point control units when said additional party is added and said second is more optimal than said first.

9. A method according to claim 7, wherein said identifying identifies one or more of said multi-point control units whose use will minimize coding resources.

10. A method according to claim 7, wherein said identifying identifies one or more of said multi-point control units whose use will maximize coding quality.

11. A method according to claim 7, wherein said identifying identifies one or more of said multi-point control units whose use will minimize network costs for said multi-point conference.

12. A telecommunications device, comprising:

means integrated with a multi-point control unit for identifying one or more multipoint controls units whose use will be optimal according to one or more criteria during a multi-point conference; and means for relaying said multi-point conference set up request to said one or more multi-point control units after said optimal determination is made;

wherein said identifying and said relaying occur while said conference is ongoing to select a new optimal multi-point control unit.

13. A system according to claim 12, wherein said identifying means is operable to determine said optimal one or more multi-point control units while a first multi-point conference is ongoing and said multi-point conference set up command seeks to add an additional party to said first multi-point conference.

14. A system according to claim 13, further comprising means for transferring control of said first multi-point conference from a first of said one or more multi-point control units to a second of said one or more multi-point control units when said additional party is added and said second is more optimal than said first.

15. A system according to claim 14, wherein said identifying means identifies one or more of said multi-point control units whose use will minimize coding resources.

16. A system according to claim 14, wherein said identifying means identifies one or more of said multi-point control units whose use will maximize coding quality.

17. A system according to claim 14, wherein said identifying means identifies one or more of said multi-point control units whose use will minimize network costs for said multi-point conference.

* * * * *